Patented Aug. 12, 1952

2,606,884

UNITED STATES PATENT OFFICE 2,606,884

ADHESIVE COMPRISING VINSOL AND A BUTADIENE - ACRYLONITRILE SYNTHETIC RUBBER

Evart E. Mayfield, Wilmington, Del., assignor to Hercules Powder Company, Wilmington, Del., a corporation of Delaware No Drawing. Application April 27, 1950, Serial No. 158,593

11 Claims. (Cl. 260—27)

This invention relates to adhesives and more particularly to adhesive compositions containing a synthetic rubber and a substantially petroleum hydrocarbon-insoluble pine wood resin.

Pressure-sensitive adhesives prepared in the past have been chiefly based upon rubber compositions in which the rubber is modified by a resin. Various rubberlike materials have been utilized, among them natural rubber and the synthetic rubbers such as the copolymer of butadiene and styrene and also neoprene. Heretofore, the resinous modifier has been a coumarone-indene resin, rosin, ester gum, or hydrogenated rosin.

While adhesive compositions made with these rubber materials and modifiers have served in many applications, they have been found wanting in several respects. First, the adhesive material in many cases lacks the high degree of bonding strength desired in many applications and in certain instances with particular materials exhibits almost no adhesive properties whatsoever. Secondly, the adhesive material has in many cases aged very poorly in that the material became tough and hard with loss of the necessary tackiness in a relatively short period of time. This difficulty has been noticeable when using coumarone-indene resins, rosin, and ester gum and has only been partially alleviated when such resins in hydrogenated form have been employed. Many attempts have been made to increase the bond strength and overcome the deterioration of the bond on aging by means of special tackifiers or other additives incorporated in the adhesive composition but the results have not been entirely satisfactory.

Now in accordance with this invention, it has been found that by dispersing a substantially petroleum hydrocarbon-insoluble pine wood resin in an elastomer formed by the copolymerization of butadiene and acrylonitrile in a manner such that the elastomer retains its original high degree of substantially complete polymerization and the ratio of resin to elastomer lies in the range from about 1:3 to about 3:2, an adhesive is produced which is characterized by particularly high bonding strength and good resistance to the aging process. The adhesive composition of this invention will retain an unusual degree of adhesive strength for prolonged periods of time.

The resin used in accordance with the present invention may be defined as the substantially petroleum hydrocarbon-insoluble pine wood resin prepared, for example, in accordance with the processes of U. S. Patents to Hall, Nos. 2,193,026 and 2,221,540. This material which is characterized herein by the term "substantially petroleum hydrocarbon-insoluble pine wood resin" is the resinous material which may be prepared from pine wood, preferably deciduous pine wood, as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form.

It is a particular feature of this invention that the adhesive composition may be prepared without depolymerizing the butadiene-acrylonitrile copolymer. Ordinarily in the preparation of rubber-based adhesives, the rubber must be depolymerized by milling in order to render it solvent-miscible and it is believed that this depolymerization is to a large extent responsible for the relatively low bonding strengths of the rubber-based adhesives known in the art. It is widely recognized that unmilled rubber is greatly superior in strength properties to rubber which has been milled and thereby depolymerized to some extent, and it is an important characteristic of the adhesive compositions of this invention that they can be prepared with practically no depolymerization of the butadiene-acrylonitrile polymer. In the preparation of the adhesives of this invention, the pine wood resin itself exerts a solvent action upon the polymeric material making it possible to obtain a solvent-soluble intimate mixture of these ingredients with a minimum of mixing at room temperatures whereby the polymeric material in the mixture remains in its original substantially completely polymerized form. The adhesive composition of this invention consequently has the advantage of the relatively high strength properties of unmilled undepolymerized butadiene-acrylonitrile polymer.

Following are examples showing the preparation of the adhesive of this invention and also showing a comparison of its high strength properties with those of adhesives well known in the art. All quantities are on a parts by weight basis unless otherwise indicated.

EXAMPLE I

One part of butadiene-acrylonitrile copolymer containing about 26% acrylonitrile and 74% butadiene and having a Mooney viscosity of 60 was put on the rolls of a two-roll mill at room temperature and 1 part of pulverized petroleum hydrocarbon-insoluble pine wood resin was added. The mixture was milled, maintaining the rolls at room temperature, until the resin was entirely dispersed and no longer. A homogeneous mixture was obtained in less than five minutes. Milling beyond this point was carefully avoided in order to prevent depolymerization of the butadiene-acrylonitrile polymer. The sheet was then removed from the rolls and weighed portions were tumbled in known quantities of methyl isobutyl ketone until complete solution was effected. By this means 25% solids solutions of the resin-polymer mixture were obtained.

EXAMPLE II

A 25% solids solution of the resin-polymer composition prepared in Example I was brushed on canvas duck and the coated fabric was dried 15 minutes at 150° C. to insure the removal of substantially all of the solvent. The dried coated canvas contained 73 lb. cement/1000 sq. ft. of surface area. The coated fabric was pressed together at 200° F. and 1000 lb./sq. in. for five minutes in such a manner that a laminated sample was obtained with two ends of the fabric unbonded. The sample was cut into one-inch strips which were conditioned for 24 hours at 77° F. and 50% relative humidity and tested on a Scott DH-2 tensile strength machine. The results are shown in Table 1 along with the results obtained with sample sheets of leather and rubber laminated with the same composition in a like manner.

Table 1

| Laminated Sample | Average Adhesive Strength (lb./in.) |
|---|---|
| Canvas to canvas | 24 |
| Leather to leather | 28.8 |
| Rubber to rubber (natural) | 6.0 |

EXAMPLE III

A standard adhesive was prepared containing 1 part of a phenol-formaldehyde resin and 1 part of butadiene-acrylonitrile copolymer which was milled at room temperature for ½ hour to render it solvent soluble. The mixture was applied to canvas sheets in a 25% solids solution in methyl isobutyl ketone such that the dried coated canvas contained 74 lb. cement/1000 sq. ft. of surface area. The samples were bonded and tested as described in Example II. It was found that this canvas laminate had an adhesive strength of 18 lb./in. as compared with 24 lb./in. for the adhesive composition of this invention as shown in Table 1.

EXAMPLE IV

A canvas laminate was prepared with an adhesive containing the same composition as the adhesive prepared in Example I with the exception that the butadiene-acrylonitrile copolymer was milled at room temperature for ½ hour. The cement was brushed on canvas duck and dried for 15 minutes at 150° C. The dried coated canvas contained 74 lb. cement/1000 sq. ft. of surface area. The samples were bonded and tested as in Example II. The laminate had an adhesive strength of 13 lb./in. as compared with the adhesive strength of 24 lb./in. of the adhesive composition of this invention containing unmilled polymeric material as shown in Table 1.

EXAMPLE V

A 25% solids solution of the resin-polymer mixture prepared in Example I was coated on 1 x 2 inch galvanized steel plates to a thickness of 10 mm. and the coated sheets were dried 15 minutes at 140° C. One square inch areas were bonded under 1000 lb./sq. in. pressure and 200° C. for five minutes and then conditioned for 24 hours at 77° F. and 50% relative humidity. The shearing strength of the adhesive composition as shown by the Scott DH-2 tensile strength tester is listed in Table 2. The shear strength of the adhesive composition when used to laminate wood sheets in the same manner as also shown in Table 2.

Table 2

| Laminated Sample | Average Adhesive Strength (lb./in.$^2$) |
|---|---|
| Wood to wood | 257 |
| Steel to steel | 300+ |

EXAMPLE VI

Samples of canvas which were laminated in the manner of Example II were tested with respect to the strength of the adhesive bond under conditions of high humidity, elevated temperature, and aliphatic solvents and alkali. The results of these tests as compared with a standard resin-butadiene-acrylonitrile copolymer adhesive and a petroleum hydrocarbon-insoluble pine wood resin emulsion-butadiene-acrylonitrile copolymer adhesive are shown in Table 3. All samples were bonded at 1000 lb./sq. in. pressure and 200° F. for five minutes. The samples immersed in kerosene were tested immediately after removal from the solvent. The samples immersed in 2% sodium hydroxide were conditioned at 77° F. and 50% relative humidity before being tested.

bamate, 5 parts mercaptobenzothiazole, 75 parts methyl isobutyl ketone, and 5 parts of water. Laminates were immediately prepared by coating Table 3

| Resin-Butadiene-Acrylonitrile Polymer | Adhesive Strength (lb./in.) | | | | | | |
|---|---|---|---|---|---|---|---|
| | 77°F. and 50% Relative Humidity, 48 hr. | 100°F. and 100% Relative Humidity— | | Kerosene | | 2% NaOH | |
| | | 24 hr. | 120 hr. | 24 hr. | 72 hr. | 24 hr. | 48 hr. |
| 1 petroleum hydrocarbon-insoluble pine wood resin:1 polymer (26% acrylonitrile content and 60 Mooney viscosity) | 21.7 | 23.1 | 24 | 27.9 | 24 | 10.1 | 11 |
| 1 petroleum hydrocarbon-insoluble pine wood resin:3 polymer (26% acrylonitrile content and 60 Mooney viscosity) | 19.1 | 27.6 | 14 | 17.1 | 3.2 | 13.4 | 15 |
| 1 petroleum hydrocarbon-insoluble pine wood resin:1 polymer (35% acrylonitrile content and 90 Mooney viscosity) | 28.6 | 27.4 | 31 | 35.3 | 34 | 27.9 | 29 |
| 1 coumarone-indene resin:1 polymer (26% acrylonitrile content and 60 Mooney viscosity) | 8.9 | 6.8 | | (1) | (1) | 9.8 | |
| 1 petroleum hydrocarbon-insoluble pine wood resin emulsion:1 polymer (40% solids content) | 22.7 | 14.5 | 29 | 14.9 | 16 | 23.0 | 20 |

[1] Too weak to test.

EXAMPLE VII

Galvanized steel laminates were prepared using the adhesive solution prepared in Example I and the method of Example V except that the coating of the steel plates was done with a 20 mm. draw-down blade. Shear tests were carried out at elevated temperatures by hanging the samples in an oven and suspending a 500-g. weight from each sample to apply a 500-g./sq. in. shearing force for the purpose of comparison with a standard galvanized steel laminate in which a coumarone-indene resin-butadiene-acrylonitrile adhesive composition was utilized as the adhesive. The results are given in Table 4.

Table 4

| Resin-Butadiene-Acrylonitrile Polymer | Temperature, °C. | Average Time Before Failure |
|---|---|---|
| | | Minutes |
| 1 petroleum hydrocarbon-insoluble pine wood resin: 1 polymer (26% acrylonitrile content and 60 Mooney viscosity) | 103 | 20 |
| 1 petroleum hydrocarbon-insoluble pine wood resin: 3 polymer (26% acrylonitrile content and 60 Mooney viscosity) | 103 | 69 |
| 1 petroleum hydrocarbon-insoluble pine wood resin: 1 polymer (35% acrylonitrile content and 90 Mooney viscosity) | 104 | 25 |
| 1 coumarone-indene resin: 1 polymer (26% acrylonitrile content and 60 Mooney viscosity) | 105 | 6 |

EXAMPLE VIII

Three parts of zinc oxide and 1.5 parts of sulfur (rubber grade) were dispersed in 800 parts of 25% solids solution of a resin-polymer mixture prepared as in Example I except that the polymer contained about 35% acrylonitrile and 65% butadiene and had a Mooney viscosity of 90. To 100 parts of this cement solution there was added 6 parts of an accelerator solution consisting of 5 parts of piperidine pentamethylene dithiocarbamate, 5 parts mercaptobenzothiazole, 75 parts methyl isobutyl ketone, and 5 parts of water. Laminates were immediately prepared by coating 1 x 2 inch galvanized steel plates with the cement solution using a 20 mm. draw-down blade, drying at 150° C., and bonding one square inch areas under conditions shown in Table 5. The bond strength as shown in Table 5 was determined by hanging the samples in an oven at 150° C. and suspending a 500-g. weight from each sample to apply a 500-g./sq. in. shearing force. These steel laminates were considerably stronger than laminates prepared from similar noncuring cements and were particularly resistant to elevated temperatures.

Table 5

| Percent Sulfur Based on Copolymer | Bonding Conditions | Elevated Temperature Test | |
|---|---|---|---|
| | | Temperature, °C. | Time Before Failure |
| 1½ | 300° F., 200 p. s. i., 8 min | 150 | No failure (1 wk.). |
| 1½ | 300° F., 200 p. s. i., 15 min | 150 | Do. |
| None | 200° F., 1000 p. s. i., 5 min | 104 | 25 min. |
| | | 117 | 13 min. 30 sec. |

EXAMPLE IX

A laminate was prepared by brushing the curing-type resin-polymer cement solution prepared in Example VIII on canvas duck, drying for eight minutes at 150° C., and bonding under the conditions shown in Table 6. Similar canvas laminates were also prepared using resin-polymer cement solutions containing 1% and 5% sulfur based on the weight of copolymer. The adhesive containing 5% sulfur contained 12 parts of the accelerator solution prepared in Example VIII per 100 parts of resin-polymer solution. These canvas laminates were stronger than laminates prepared from similar noncuring cements.

Table 6

| Percent Sulfur Based on Copolymer | Bonding Conditions | Cement Add-on Lb./1000 Sq. Ft. | Adhesive Strength Lb./Linear In. |
|---|---|---|---|
| 1% | 300° F., 200 p. s. i., 8 min | 82 | 35 |
| 1½ | 300° F., 200 p. s. i., 8 min | 86 | 36 |
| 5 | 300° F., 200 p. s. i., 15 min | 83 | 30 |
| None | 200° F., 1000 p. s. i., 5 min | 84 | 29 |

As used herein, the phrase "substantially petroleum hydrocarbon-insoluble pine wood resin" is intended to designate not only the resin itself but equivalents thereof such as, for example, modifications of the resin with higher melting points such as the resin which has been heat-treated and other equivalent modifications or materials which embody the resin and have properties attributable to the content of the resin.

The resin may be used directly or in the form of an emulsion. The resin emulsions when mixed with butadiene-acrylonitrile copolymers produce an adhesive which has been found to be particularly advantageous in the bonding of vinyl floor covering to felt base. Excellent adhesion was obtained without excessive bleeding of the felt base.

As noted above, one of the important characteristics of the adhesive composition of this invention is that it may be very easily and conveniently prepared. Ordinarily the resin will be dispersed in the copolymeric material by means of a milling machine because of the easy availability of this means of mixing and the convenient sheetlike form of the product. However, other mixing means are equally operable. The substantially petroleum-insoluble pine wood resin is compatible with the polymer and exerts a solvent action which effects a homogeneous mixture of the two ingredients very quickly. Thus, the adhesive composition of this invention enjoys a significant advantage over the rubber-based adhesive compositions of the art in that it contains unmilled polymeric material which has appreciably higher strength properties than rubber which has been milled and thereby depolymerized.

Any of the commercially available butadiene-acrylonitrile polymeric materials are operable in this invention. The examples have illustrated the operability of a 26:74 acrylonitrile:butadiene copolymer having a Mooney viscosity of 60 and a 35:65 acrylonitrile:butadiene copolymer having a Mooney viscosity of 90, but copolymers of acrylonitrile and butadiene having other ratios of monomers and other viscosities than those illustrated are equally operable. The compatibility of substantially petroleum hydrocarbon-insoluble pine wood resin with butadiene-acrylonitrile copolymer decreases as the acrylonitrile content of the copolymer is reduced and copolymers containing only a small portion of acrylonitrile produce adhesives of a quality inferior to the adhesives illustrated in the examples. On the other hand, butadiene-acrylonitrile copolymers containing considerable quantities of acrylonitrile, say of the order of 75% or more, lack rubbery characteristics and the adhesive produced with such copolymers are likewise inferior to those shown in the examples. In general, the copolymers useful in this invention contain between about 15% and 75% acrylonitrile and preferably between about 25% and 50% acrylonitrile. The butadiene-acrylonitrile copolymers are known as Buna N rubbers and are available in the United States under various trade names. Copolymers having Mooney viscosities in the range of from about 30 to 110 are operable in this invention and copolymers with Mooney viscosities in the range of 60 to 110 are preferred.

It has been found that the proportions of the ingredients of the adhesive compositions of this invention must be kept within fairly strict limits if the particularly high bonding strengths obtainable according to this invention are to be consistently achieved. Thus a ratio of resin to polymer in the range of about 1:3 to about 3:2 is desirable and a ratio in the range of about 2:3 to about 1:1 is preferred. It will be appreciated, of course, that in any given instance the particular materials to be bonded will play an important part in determining the exact composition which will produce the best bond. Likewise, the material or materials to be adhered will dictate the optimum conditions of pressure, temperature, and humidity to be employed during the bonding operation.

The adhesive composition of this invention produces high strength bonds with an unusually wide variety of different materials, many of which are illustrated in the examples. The adhesive compositions of this invention are effective on paper, glass, cellophane, rubber, metal, cloth, leather, wood, etc., both in producing laminates and producing bonds between unlike materials. The adhesive has excellent resistance to water, alkali, and aliphatic solvents. A particular advantage of the adhesive composition lies in the high strength bond it produces between aluminum and aluminum, aluminum and wood. Excellent bonds are also produced between aluminum and asbestos board, leather and birch wood, sponge rubber and wood, and polyvinyl chloride and copper.

In order to facilitate the application of the pine wood resin-butadiene-acrylonitrile composition of this invention, it is desirable to dissolve the mixture in a suitable solvent such as, for example, methyl isobutyl ketone, methyl ethyl ketone, acetone, ether, or the like. A solution of the mixture may also be obtained by first dissolving the pine wood resin in the solvent and then adding the polymeric material. It will be appreciated that the solvent chosen in any given instance does not affect appreciably the bond strength produced by the adhesive. Desirable solvents are those permitting a high rate of dissolution of the adhesive mixture, a fast rate of drying after application of the solution to the surface, and which are readily available at low cost. For room temperature applications, solutions of the adhesive composition containing between about 20% and about 45% solids have been found to have viscosities which are easily workable and solutions with solids content between about 30 and 35% are preferred. At application temperatures higher or lower than room temperature, the desired solution concentration will be displaced accordingly.

Normally adhesive bonds are made at elevated temperatures and after substantially all the solvent has been removed from the adhesive cement. Vapor bubbles and consequently poor adhesion usually occur when solvent is present. However, laminates may also be prepared at room temperature and, in so doing, it is desirable to make the bond before the adhesive is solvent free and while it is still tacky. Although such bonds are fairly weak at first due to the presence of the solvent, they gradually grow stronger as the solvent escapes and ultimately achieve a strength comparable to bonds made at elevated temperatures with solvent-free cements.

The resistance of the bonds made by the adhesives of this invention to elevated temperatures can be increased markedly by the addition of sulfur and accelerators immediately prior to bonding. As shown by Example VIII, a curing-type adhesive containing 1.5% sulfur based upon the copolymer yields a bond which will not fail even after being subjected to a temperature of 150° C. for a week, whereas a similar noncuring-type cement failed in less than a half-hour under less severe conditions. Example IX shows that curing-type cements form canvas laminates which are considerably stronger than those formed by similar noncuring cements. The amount of sulfur which can be incorporated into the resin-polymer compositions of this invention to yield desirable curing-type adhesives lies in the range of about 1% to about 35% based upon the weight of copolymer but a sulfur content of the order of about 1 to 10% is preferred. About 2% sulfur based upon the copolymer is optimum for the best resistance to elevated temperatures.

What I claim and desire to protect by Letters Patent is:

1. An age-resistant, highly tacky, adhesive composition comprising a substantially petroleum hydrocarbon-insoluble, aromatic hydrocarbon-soluble resinous extract of pine wood and a substantially completely polymerized butadiene-acrylonitrile polymer in the ratio of from about 1:3 to about 3:2.

2. An adhesive composition according to claim 1 in which the ratio of resin to polymer is from about 2:3 to about 1:1.

3. An adhesive composition according to claim 1 in which the resin is in the form of an emulsion.

4. An adhesive composition according to claim 2 in which the resin is in the form of an emulsion.

5. An adhesive composition according to claim 1 containing a solvent for the mixture.

6. An adhesive composition according to claim 1 containing up to about 35% sulfur based upon the weight of copolymer.

7. An adhesive composition according to claim 1 containing between about 1% and about 10% sulfur based upon the weight of copolymer.

8. A process for preparing an age-resistant, highly tacky, rubber-based adhesive composition which comprises incorporating a substantially petroleum hydrocarbon-insoluble, aromatic hydrocarbon-soluble resinous extract of pine wood into a substantially completely polymerized butadiene-acrylonitrile copolymer in an amount between about 33% and about 150% by weight based on the copolymer.

9. A process for preparing an age-resistant, highly tacky, rubber-based adhesive composition which comprises incorporating a substantially petroleum hydrocarbon-insoluble, aromatic hydrocarbon-soluble resinous extract of pine wood into a substantially completely polymerized butadiene-acrylonitrile copolymer in an amount between about 33% and about 150% by weight based on the copolymer, then dissolving the resulting composition in a solvent selected from the group consisting of volatile ketones and ethers.

10. A process for preparing an age-resistant, highly tacky, rubber-based adhesive composition which comprises in combination the following steps: Placing substantially completely polymerized butadiene-acrylonitrile copolymer upon the cold rolls of a milling machine, adding powdered resin thereto in an amount from about 33% to about 150% by weight of the copolymer, said resin being a substantially petroleum hydrocarbon-insoluble, aromatic hydrocarbon-soluble resinous extract of pine wood, and milling the mixture at room temperature until the powdered resin has been dispersed and no longer.

11. A process for preparing an age-resistant, highly tacky, rubber-based adhesive composition which comprises incorporating a substantially petroleum hydrocarbon-insoluble, aromatic hydrocarbon-soluble resinous extract of pine wood into a substantially completely polymerized butadiene-acrylonitrile copolymer in an amount between about 33% and about 150% by weight based on the copolymer, dissolving the resulting composition in a solvent selected from the group consisting of volatile ketones and ethers, and dispersing in the resulting solution up to about 35% sulfur based upon the weight of the copolymer.

EVART E. MAYFIELD.

REFERENCES CITED

The following references are of record in the file of this patent:

UNITED STATES PATENTS

| Number | Name | Date |
|---|---|---|
| 2,340,699 | Sarbach | Feb. 1, 1944 |
| 2,444,830 | Kellgren et al. | July 6, 1948 |
| 2,476,714 | Ender | July 19, 1949 |
| 2,491,477 | Chmiel | Dec. 20, 1949 |

OTHER REFERENCES

"Vinsol Resin"—Hercules Powder Co., Wilmington, Delaware, page 8.

Industrial and Engineering Chem.—November 1947, vol. 39, No. 11, page 52A.